United States Patent [19]

Tazuma et al.

[11] 4,017,560
[45] Apr. 12, 1977

[54] AQUEOUS EMULSION LATEX DERIVED RUBBERY COPOLYMER

[75] Inventors: James J. Tazuma, Stow; Mario D. Zadra, Barberton, both of Ohio

[73] Assignee: The Goodyear Tire & Rubber Company, Akron, Ohio

[22] Filed: Dec. 18, 1975

[21] Appl. No.: 641,848

Related U.S. Application Data

[62] Division of Ser. No. 510,332, Sept. 30, 1974, Pat. No. 3,929,737.

[52] U.S. Cl. .......................... 260/888; 260/27 BB; 260/29.7 UA; 260/29.7 UP
[51] Int. Cl.² .................. C08F 2/24; C08F 255/08; C08F 285/00
[58] Field of Search ... 260/888, 29.7 UA, 29.7 UP, 260/27 BB

[56] References Cited

UNITED STATES PATENTS

| | | | |
|---|---|---|---|
| 2,824,859 | 2/1958 | Fasce | 260/78.5 |
| 3,743,616 | 7/1973 | Kest | 260/27 BB |
| 3,799,901 | 3/1974 | McKann et al. | 260/29.6 PM |
| 3,813,357 | 5/1974 | St. Cyr | 260/5 |
| 3,872,064 | 3/1975 | Pace et al. | 260/80.7 |
| 3,943,086 | 3/1976 | Schein et al. | 260/29.7 D |

*Primary Examiner*—John Kight, III
*Attorney, Agent, or Firm*—F. W. Brunner; H. C. Young, Jr.

[57] ABSTRACT

An aqueous emulsion latex-derived rubbery copolymer prepared by free radical polymerizing 100 parts by weight of a mixture comprising about 60 to about 95 weight percent of a diene selected from 1,3-butadiene and isoprene and, correspondingly, about 40 to about 5 weight percent of a comonomer selected from styrene and acrylonitrile, in the presence of about 2 to about 6 weight percent of a soap which comprises about 50 to about 100 weight percent of the sodium or potassium salt of an anhydride modified resin backbone characterized by having a softening point in the range of about 45° to about 100° C having a basic resin backbone of piperylene and methyl branched monoolefins.

9 Claims, No Drawings

AQUEOUS EMULSION LATEX DERIVED RUBBERY COPOLYMER

This is a division of application Ser. No. 510,332 filed Sept. 30, 1974, now U.S. Pat. No. 3,929,737.

This invention relates to a resinous composition and to its method of preparation. This invention particularly relates to the preparation of resins from maleic anhydride and selected hydrocarbon resins derived from piperylene and selected branched monoolefins.

Maleic anhydride can copolymerize with some olefin and diolefin monomers and can also undergo a Diels Alder reaction with some dienes to form adducts.

Some olefins and diolefins can be copolymerized to form useful resins. For example, a unique resin, characterized by having a softening point in the range of about 10° to about 30° C, having a backbone derived from piperylene and 2-methyl-2-butene can be prepared by polymerizing the monomers with boron trifluoride. Such relatively low softening point resins derived from piperylene and selected branched chain monoolefins have been found to have unique utilities in the field of tackifying resins for rubbery materials and particularly in the field of relatively sophisticated pressure sensitive adhesives.

However, such low softening point resins must generally be used as a plasticizing tackifying resin and therefore mixed with other higher softening point tackifiers in order to provide a satisfactory tackifying utility for adhesives and various coatings.

Therefore, it is an object of this invention to provide a higher softening resin with an improved resin composition which can be used, in turn, to provide greater utility.

In accordance with this invention, a resinous material has been discovered which is characterized by having a softening point in the range of about 45° to about 100° C preferably about 50° to about 90° C, and having a basic resin backbone of piperylene and methyl branched monoolefins which comprises about 50 to about 60 mole percent units derived from piperylene and about 20 to about 30 mole percent units derived from monoolefins selected from at least one methyl branched chain $\alpha$ or $\beta$ monoolefin containing 4 to 6 carbon atoms, where the mole ratio piperylene to said branched monoolefin is about 0.8/1 to about 2/1, in combination with about 10 to about 30 mole percent units derived from maleic anhydride, based on the total resin composition. The resinous composition of this invention is required to be prepared by the method which comprises the steps of (A) reacting about 30 to about 60 parts by weight maleic anhydride, or about 10 to about 25 parts by weight maleic anhydride in the presence of an organoperoxide at a temperature in the range of about 150° to about 250° C with 100 parts by weight of a hydrocarbon-derived resin having a softening point in the range of about 10° to about 50° C prepared by polymerizing in the presence of a catalyst selected from boron trifluoride and boron trifluoride etherate, a monomer mixture which comprises about 40 to about 70 weight percent piperylene, and correspondingly, about 60 to about 30 weight percent of at least one monoolefin selected from methyl branched chain $\alpha$ or $\beta$ monoolefin containing 4 to 6 carbon atoms, where the weight ratio of piperylene to said branched chain monoolefin is about 0.8/1 to about 2.0/1 and (B) removing unreacted maleic anhydride, if any, preferably by distillation.

Therefore, this invention requires a resin having a backbone of piperylene/methyl branched chain monoolefin in combination with units derived from maleic anhydride. Furthermore, the amount of maleic anhydride typically in the resin composition's preparation is substantially reduced by the use of a free radical initiator such as organoperoxides.

Various methyl branched chain monoolefins having $\alpha$ or $\beta$ double bonds can be used. Representative of such monoolefins are isobutylene, 2-methyl-1-butene, 2-methyl-2-butene, 2-methyl-1-pentene and 2-methyl-2-pentene. The five carbon atom-containing 2-methyl-1-butene and 2-methyl-2-butene are generally preferred.

The maleic anhydride modification of the hydrocarbon-derived resin is preferably facilitated by reacting maleic anhydride with the resin to an extent sufficient to achieve a resinous product having an acid number of about 175 to about 350 after excess maleic anhydride removal. Therefore this acid number range is an important measure, test or indicator of the required extent of maleic anhydride modification.

The modification reaction can be conducted at a temperature in the range of about 150° to about 250° C. If a solvent or diluent is used, the temperature of the reaction can be controlled by the boiling point of the solvent selected or carried out high pressure vessel. A generally preferred temperature range is about 180° to about 200° C. Typically, the reaction can take about 3 to about 6 hours. The reaction can be conducted at atmospheric pressure or above atmospheric pressure. Also, the reaction can be conducted as a batch process or on a continuous basis. At the conclusion of the reaction, it is generally desired and typically required to remove any excess maleic anhydride usually by distillation, particularly vacuum distillation, or distillation under a reduced pressure, such as from about 5 to about 500, preferably about 10 to about 100 millimeters mercury at a temperature in the range of about 120° to about 140° C.

It is generally desired that the modification reaction be conducted substantially free of organic solvents or diluents. If a solvent is desired, generally up to about 50 weight percent solvent can be used, although preferably a maximum of about 20 weight percent is allowed based on the total reaction medium or mixture consisting of solvent, maleic anhydride and hydrocarbon-derived resin. Representative of various organic solvents are 0-dichlorobenzene, decalin, tetralin, diisopropyl benzene, and aromatic solvents boiling in the range of about 150° to about 200° C.

A free radical initiator can be used if desired. If such an initiator is used, usually about 5 to about 15 mole percent is used, based on the said maleic anhydride. Representative of the many various well known free radical initiators are organoperoxides such as di-t-butyl peroxide, di-t-amyl peroxide, t-butyl cumyl peroxide and dicumyl peroxide. Usually, the free radical initiator is added slowly, or incrementally, to the reaction mixture over a period of time, such as about 5 to 180 minutes, in order to maintain control of the reaction. In addition, when an initiator is employed the maleic anhydride to the basic resin backbone weight ratio is typically lowered to about 0.1:1 to about 0.25:1.

The hydrocarbon-derived resin necessary for this invention is characterized by a relatively low softening point in the range of about 10° to about 50° C, particularly and preferably about 10° to about 40° C and is the product of polymerizing in the presence of boron trifluoride or boron trifluoride etherate a mixture which comprises about 40 to about 70 weight percent piperylene, and, correspondingly, about 60 to about 30 weight percent of a branched monoolefin selected from methyl branched tertiary α and β olefins having from 4 to 6 carbon atoms. It is preferred that the monomer mixture to be polymerized comprises from about 45 to about 65 weight percent piperylene and, correspondingly, about 55 to about 35 weight percent of said methyl branched tertiary monoolefin. Preferably said monoolefin is a methyl branched α-olefin containing 5 to 6 carbon atoms. Even more preferably, it is 2-methyl-2-butene.

The basic resin used for this invention, in addition to its characteristic low softening point, may be further characterized by having a viscosity in the range of about 400 to about 1,000,000 and preferably about 1,000 to about 100,000 centipoises (cps) at about 25° C depending somewhat upon the degree of stripping of the resin product to remove light oil-like products and unreacted hydrocabons. This reference to degree of stripping is not intended to be misleading or ambiguous. Typically, the major portion of the polymerization product is the resin for this invention whereas only a minor portion consists of oil-like products. Reference is made to the degree of stripping only because of the sensitivity of viscosity to very small amounts of low viscosity oil-like products and unreacted hydrocarbons. It is thus desired to strip the product to remove at least about 95 weight percent of such materials. In practice, about 50 to about 85, preferably about 60 to about 80, weight percent of the piperylene/branched olefin mixture is typically converted to the resin.

The characteristic softening point of the maleic anhydride modified basic resin backbone product and of the basic resin itself can be determined by ASTM Method E-28-58T, which might be modified by first cooling the sample below room temperature and then gradually heating it to the resin's softening point, where the softening point is room temperature.

The polymerization reaction of the basic resin is conveniently carried out in the presence of a diluent because it is usually exothermic. Various diluents which are inert in that they do not enter into the polymerization reaction can be used. Representative examples of inert diluents are aliphatic hydrocarbons such as pentane, hexane, and heptane and aromatic hydrocarbons such as toluene and benzene. Unreacted hydrocarbons from the reaction mixture itself can be a diluent. The aliphatic and unreacted hydrocarbons are preferred.

A wide range of temperature can be used for the polymerization reaction for the preparation of the basic resin such as about −50° to about 50° C and preferably in the range of about 0° to about 30° C. The reaction can be carried out at atmospheric or above or below atmospheric pressure. Typically, a satisfactory polymerization can be conducted at atmospheric pressure or at about autogenous pressure developed by the reactants under the operating conditions used. The time of reaction is not particularly of primary importance and can vary from a few minutes to 12 hours or more.

The basic resin backbone polymerizate is typically distilled, by steam distilling for example, to remove light oil-like products, unreacted hydrocarbons and solvent, if used, to yield the product resin.

In the practice of this invention, the catalyst for preparing the basic resin backbone is required to be selected from boron trifluoride and a boron trifluoride etherate. The boron trifluoride etherate catalyst used to prepare the resin is a complex of the type derived from boron trifluoride and an ether having from 2 to about 12, and preferably from 2 to about 6, carbon atoms. The complex is generally represented by the formula:

$$BF_3 \cdot OR_2$$

Representative of various ethers for preparation of the etherate are those having the structure ROR', where R and R' are individually selected from saturated alkyl radicals having from 1 to about 6, and preferably from 1 to about 3, carbon atoms, such as methyl, ethyl, n-propyl, isopropyl, n-butyl, isobutyl, sec.-butyl, n-pentyl, isopentyl, t-pentyl, isohexyl, n-hexyl and t-hexyl radicals. The ethyl radical is usually preferred. The complex, when not available commercially, can generally be prepared by reacting boron trifluoride gas with an ether in about equimolar quantities in an inert atmosphere at a temperature in the range of about −25° to about 25° C, and usually in the range of about 10° to about 25° C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethylhexyl)ether. Diethyl ether is usually preferred.

Although the maleic anhydride-modified basic resin backbone of this invenion can be mixed directly as a tackifier with various rubbery materials, it has a unique utility of being able to be incorporated directly into the rubbery molecule, or polymer. For example, a rubber can be prepared by polymerizing monomers to form a latex, with the maleic anhydride-modified resin being utilized in the soap solution for the latex. By this method, the modified resin in incorporated directly into the rubber, thereby having a particularly enhanced value by having the ability to become a part of the rubber itself without migrating or volatilizing when the rubber is exposed to an elevated temperature for a prolonged time.

The importance of this utility is particularly amplified in that the anhydride-modified resin can now totally, or at least substantially, replace the normally required rosin acid soap in the emulsion polymerization medium.

Therefore, in further accordance with this invention, an aqueous emulsion latex-derived copolymer, preferably a rubbery copolymer, can be prepared by free radical polymerizing 100 parts by weight of a mixture comprising about 60 to about 95 weight percent of a diene selected from 1,3-butadiene and isoprene and, correspondingly, about 40 to about 5 weight percent of a comonomer selected from styrene and acrylonitrile, in the presence of about 2 to about 6 weight percent of a soap which comprises about 50 to about 100 weight percent of the sodium or potassium salt of the anhydride modified resin of this invention and correspondingly about 50 to about 0 weight percent of a sodium or potassium salt of a rosin acid. Such a copolymerization is generally conducted at a temperature in the range of about 40° to about 80° C.

The soap solution itself can be prepared by first forming a mixture comprising about 100 parts by weight of soap, which, in turn, comprises about 50 to about 100 parts by weight of the maleic anhydride modified resin of this invention, and correspondingly, about 50 to about 0 parts by weight of rosin acid, and zero to 50 parts by weight of fatty acid, preferably selected from at least one of stearic, oleic and palmitic acid, and about 350 to about 450 parts by weight of water with the corresponding formation of acid of said anhydride-modified resin by hydrolyzation. Then a sufficient parts by weight of sodium hydroxide or potassium hydroxide in about 200 to about 300 parts by weight water is slowly added to achieve a final pH of about 8 to about 11.

Upon coagulation of the rubber portion of the latex, the rubbery copolymer is recovered which has the anhydride-modified resin tackifier of this invention attached directly to its molecular network. Thus, the modified resin of this invention functions both as an emulsifying agent for the preparation of the rubbery copolymer and as a tackifying resin for the rubber itself.

The practice of this invention is further illustrated by reference to the following examples which are intended to be representative rather than restrictive of the scope of the invention. Unless otherwise indicated, all parts and percentages are by weight.

EXAMPLE I

To a series of reactors, identified herein as representing Experiments A-E, was charged maleic anhydride, and a basic hydrocarbon resin which had been prepared by polymerizing a mixture comprising piperylene and various branched chain monoolefins selected from isobutylene, 2-methyl-1-butene, 2-methyl-2-butene, 2-methyl-1-pentene, and 2-methyl-2-pentene in the presence of boron trifluoride. The maleic anhydride reactions were allowed to proceed for about 6 hours at about 195° C. At this time, excess maleic anhydride was removed from the system under a reduced pressure of about 10 millimeters of mercury at 130° C. It was determined that typically about 20 to about 30 weight percent of the maleic anhydride went into the resin. The resin was then recovered by decanting from the reactor. The softening points of the resulting resins were taken according to ASTM E-28-58-T.

The reaction mixture recipes and resulting softening points and acid numbers of the resin compositions are more clearly shown in the following Table 1. The amounts of materials are listed as parts by weight.

TABLE 1

| Experiments | A | B | C | D | E |
|---|---|---|---|---|---|
| Basic Resin | | | | | |
| Piperylene | 65 | 65 | 65 | 65 | 65 |
| Isobutylene | 35 | | | | |
| 2-methyl-1-butene | | 35 | | | |
| 2-methyl-2-butene | | | 35 | | |
| 2-methyl-1-pentene | | | | 35 | |
| 2-methyl-2-pentene | | | | | 35 |
| Solvent [heptane] | 50 | 50 | 50 | 50 | 50 |
| Pzn Temp (°C) | 30° C | 30° C | 30° C | 30° C | 30° C |
| Basic resin (25° C) viscosity (cps) | 168,000 | 80,000 | 148,000 | 28,000 | 148,000 |
| Modified Resin Composition (Maleic Anhydride Product) | | | | | |
| Maleic Anhydride | 23 | 30 | 20 | 26 | 26 |
| Basic Hydrocarbon Resin | 77 | 70 | 80 | 74 | 74 |
| Modified Resin | | | | | |

TABLE 1-continued

| Experiments | A | B | C | D | E |
|---|---|---|---|---|---|
| Composition Softening point | 92° C | 81° C | 81° C | 98° C | 93° C |
| Modified Resin Composition Acid number | 268 | 345 | 232 | 294 | 302 |

EXAMPLE II

To a reactor equipped with a condenser, stirrer and thermometer was charged 450 parts of a basic resin prepared from piperylene and 2-methyl-2-butene and 294 parts maleic anhydride. The mixture was heated to 190° C. The reaction was allowed to proceed for 5 hours and then cooled to about 100° to about 125° C at which time the unreacted maleic anhydride was flash distilled under a reduced pressure to final condition of about 130° to about 135° C at about 8 to 10 milliliters mercury. The remaining hot composition was poured into an aluminum dish and allowed to cool. The product was analyzed according to ASTM Method E28-58T to have a softening point of 78° C. The product was further analyzed by Goodyear Method AR 505 with sodium hydroxide and determined to have an acid number of about 220 for the hydrolyzed anhydride.

In this example, the piperylene/2-methyl-2-butene resin had been prepared by polymerizing a monomer mixture comprising about 65 parts by weight piperylene and, correspondingly, about 35 parts by weight 2-methyl-2-butene with boron trifluoride. This resulting resin had a softening point of about 20° C.

EXAMPLE III

A resinous composition was prepared according to the method of Example II except that about 98 parts of o-dichlorobenzidene was included in the initial charge to the reactor. The reaction temperature was maintained at reflux of the solvent or about 180° to about 184° C. The softening point of the resulting resin composition was determined to be about 70° C and its acid number was determined to be about 220.

EXAMPLE IV

To a 1-liter, 3-neck, flask, equipped with a condenser, stirrer and thermometer was charged 475 grams (1 mole) of a hydrocarbon-derived resin and 98.1 grams (1 mole) maleic anhydride. Said hydrocarbon-derived resin had been previously prepared by polymerizing a mixture comprising piperylene and 2-methyl-2-butene, where the mole ratio of piperylene to 2-methyl-2-butene was about 1.2:1, in the presence of boron trifluoride. Such resin had a softening point in the range of about 18° to about 25° C. The mixture was heated to a temperature of about 175° to about 180° C and 14.6 grams (0.1 mole) di-t-butyl peroxide was slowly and continuously added over a period of about 30 minutes. After stirring the mixture for an additional two hours, a vacuum stripper was attached to the flask and the decomposition products of the di-t-butyl peroxide and any unreacted maleic anhydride was removed under reduced pressure. Actually, very little maleic anhydride was removed. The final conditions of removal were a temperature of about 175° to about 180° C and a reduced pressure of about 15 to about 20 milliliters of mercury. The remaining hot product was simply poured from the flask into an aluminum dish and allowed to cool.

The cooled product was an amber solid having a Gardner color of 11 and a softening point of about 67° C. Its acid number, according to Method AR 505, was determined to be about 175.

EXAMPLE V

A 15 percent soap solution of the maleic anhydride-modified basic hydrocarbon-derived resin backbone of Example IV was prepared. The preparation involved mixing 573 grams of said anhydride-modified resin, 2700 grams hot water and 29.6 grams of a potassium soap of fatty acids such as stearic acid, oleic acid and palmitic acid at 75° to 95° C. Then, 96.3 grams of potassium hydroxide in 880 grams water was slowly added over a period of about 15 to about 30 minutes. The mixture was maintained at about 90° to about 95° C and stirring continued for about 3 to about 4 hours. A soap solution resulted having a final pH of about 10.

EXAMPLE VI

A batch of aqueous latex was prepared in conventional manner by polymerizing 100 parts of a monomer mixture comprising 25 parts styrene and 75 parts, 1,3-butadiene in the presence of a redox initiator system at 50° C using 4.5 parts of soap as prepared in Example V. The monomers were copolymerized to a 60 percent conversion, following which the latex was steam stripped and the resulting copolymer acid coagulated, washed and oven dried at about 82° C. A sheet of the rubbery copolymer was visually determined to have better building tack, as its ability to stick to itself, then a similar control sample of copolymer prepared with a soap solution containing rosin acid soap instead of the potassium salt of the anhydride-modified resin of this invention.

EXAMPLE VII

A batch of latex was prepared according to the method of Example VI, except that the soap consisted of a 50/50 mixture of the potassium salt of a fatty acid as a mixture of stearic, oleic and palmitic acids and the potassium salt of the maleic anhydride-modified resin of this invention. A stable coagulum-free latex was obtained from which the copolymer was coagulated, washed and oven dried.

While certain representative embodiments and details have been shown for the purpose of illustrating the invention, it will be apparent to those skilled in this art that various changes and modifications may be made therein without departing from the spirit or scope of the invention.

What is claimed is:

1. An aqueous emulsion latex-derived rubbery copolymer prepared by the method which comprises free radical polymerizing 100 parts by weight of a mixture comprising about 60 to about 95 weight percent of a diene selected from 1,3-butadiene and isoprene and, correspondingly, about 40 to about 5 weight percent of a comonomer selected from styrene and acrylonitrile, in the presence of about 2 to about 6 weight percent of a soap which comprises about 50 to about 100 weight percent of the sodium or potassium salt of an anhydride-modified resin backbone and, correspondingly, about 50 to about 0 weight percent of a sodium or potassium salt of a rosin acid where said modified resin backbone is characterized by having a softening point in the range of about 45° to about 100° C. having a basic resin backbone of piperylene and methyl branched monoolefins which comprises about 50 to about 60 mole percent units derived from piperylene and about 20 to about 30 mole percent units derived from monoolefins selected from at least one methyl branched chain α or β monoolefin containing 4 to 6 carbon atoms, where the mole ratio of piperylene to said branched monoolefin is about 0.8/1 to about 2/1, in combination with about 10 to about 30 mole percent units derived from maleic anhydride, based on the total resin composition.

2. The rubbery copolymer of claim 1 prepared by copolymerizing 1,3-butadiene and styrene where said anhydride-modified resin backbone is characterized by having a softening point in the range of about 50° to about 90° C and is prepared by reacting maleic anhydride with a basic resin backbone, itself characterized by having a softening point in the range of about 10° to about 40° C, and prepared by polymerizing, in the presence of boron trifluoride, a mixture which comprises about 40 to about 70 weight percent piperylene and about 70 to about 40 weight percent of a methyl branched monoolefin containing 5 to 6 carbon atoms comprising primarily 2-methyl-2-butene.

3. The rubbery copolymer of claim 1 where said modified resin backbone is prepared by the method which comprises the steps of (A) reacting about 30 to about 60 parts by weight maleic anhydride, or about 10 to about 25 parts by weight maleic anhydride in the presence of an organoperoxide at a temperature in the range of about 150° to about 250° C. with 100 parts by weight of a hydrocarbon-derived resin having a softening point in the range of about 10° to about 50° C. prepared by polymerizing in the presence of a catalyst selected from boron trifluoride and boron trifluoride etherate, a monomer mixture which comprises about 40 to about 70 weight percent piperylene, and correspondingly, about 60 to about 30 weight percent of at least one monoolefin selected from methyl branched chain α or β monoolefin containing 4 to 6 carbon atoms, where the weight ratio of piperylene to said branched chain monoolefin is about 0.8/1 to about 2.0/1 and (B) removing unreacted maleic anhydride, if any, by distillation.

4. The rubbery copolymer of claim 3 where said branched chain monoolefins are selected from isobutylene, 2-methyl-1-butene, 2-methyl-2-butene, 2-methyl-1-pentene and 2-methyl-2-pentene.

5. The rubbery copolymer of claim 3 where maleic anhydride is reacted with said resin to an extent sufficient to achieve a resinous product having an acid number of about 175 to about 350 after excess maleic anhydride removal.

6. The rubbery copolymer of claim 3 prepared by reacting maleic anhydride with said basic resin backbone in the presence of a free radical initiator selected from di-t-butyl peroxide, di-t-amyl peroxide, t-butyl cumyl peroxide and dicumyl peroxide.

7. The rubbery copolymer of claim 6 where the weight ratio of maleic anhydride to the basic resin backbone is about 0.1/1 to about 0.25/1.

8. The rubbery copolymer of claim 3 where said boron trifluoride etherate is a complex derived from boron trifluoride and an ether selected from dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethylhexyl)ether.

9. The aqueous emulsion latex-derived rubbery copolymer of claim 1 derived by free radical polymerizing said monomer mixture in the presence of an aqueous soap solution wherein said soap comprises about 50 to about 100 parts by weight of the maleic anhydride-modified resin backbone of claim 1 and, correspondingly, about 50 to about 0 parts by weight of rosin acid, or its sodium or potassium salt, about 0 to about 50 parts by weight of a fatty acid, water and sufficient sodium hydroxide or potassium hydroxide to achieve a soap solution pH in the range of about 8 to about 11.

* * * * *